(12) United States Patent
Maekawa et al.

(10) Patent No.: US 7,226,970 B2
(45) Date of Patent: Jun. 5, 2007

(54) RESIN COMPOSITION AND MOLDED ARTICLE THEREOF

(75) Inventors: Tomohiro Maekawa, Niihama (JP); Kenji Manabe, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 275 days.

(21) Appl. No.: 10/805,319

(22) Filed: Mar. 22, 2004

(65) Prior Publication Data

US 2004/0192854 A1 Sep. 30, 2004

(30) Foreign Application Priority Data

Mar. 26, 2003 (JP) .............................. 2003-085680

(51) Int. Cl.
*C08F 220/18* (2006.01)
*C08F 212/08* (2006.01)

(52) U.S. Cl. ...................... 524/560; 524/575; 524/577; 524/81

(58) Field of Classification Search ................ 524/560, 524/575, 577, 81
See application file for complete search history.

(56) References Cited

U.S. PATENT DOCUMENTS 6,337,362 B1 * 1/2002 Reynolds et al. ........... 523/442
6,433,044 B1 8/2002 Maekawa et al.

OTHER PUBLICATIONS

J.E. Pickett et al., "Photodegradation of UV screeners", *Polymer Degradation and Stability*, vol. 42, 1993, pp. 231-244.

* cited by examiner

*Primary Examiner*—David W. Wu
*Assistant Examiner*—Satya B. Sastri
(74) *Attorney, Agent, or Firm*—Sughrue Mion, PLLC

(57) ABSTRACT

A resin composition comprising a 2-(1-arylalkylidene) acetic ester and at least one resin selected from a methyl methacrylate resin, a styrene resin and a methyl methacrylate-styrene copolymer resin is provided, wherein the acetic ester is contained in the composition in an amount of from about 0.0005 part by weight to about 0.1 part by weight with respect to 100 parts by weight of the resin. The resin composition is improved in durability without deteriorating the excellent properties of the resin, such as being colorless and transparent.

4 Claims, 1 Drawing Sheet

RESIN COMPOSITION AND MOLDED ARTICLE THEREOF

BACKGROUND OF THE INVENTION

1. Field of the Invention

The present invention relates to a resin composition and a molded article thereof.

2. Related Art

Methyl methacrylate resin is useful as a colorless and transparent thermoplastic resin. A methyl methacrylate resin composition containing an ultraviolet absorbent has been known for improving durability of methyl methacrylate resin. For example, reference JETI, Vol. 46, No. 5 (published in 1998; pp. 116 to 121) discloses a methyl methacrylate resin composition and a styrene resin composition, each containing a salicylate-based ultraviolet absorbent, a cyanoacrylate-based ultraviolet absorbent or a benzotriazole-based ultraviolet absorbent as an ultraviolet absorbent.

SUMMARY OF THE INVENTION

Such a conventional methyl methacrylate resin composition, however, may have problems such that the durability thereof is not necessarily sufficient, or a large quantity of ultraviolet absorbents for further improving the durability causes a slight coloration, possibly resulting from the ultraviolet absorbents.

The inventors of the present invention have conducted studies for developing a methyl methacrylate resin composition having a superior durability without deteriorating the properties of methyl methacrylate resin, such as being colorless and transparent. As a result, the inventors have found that a methyl methacrylate resin composition containing a 2-(1-arylalkylidene) acetic ester is less colored with maintaining transparent while having a superior durability.

The present invention provides a resin composition comprising a 2-(1-arylalkylidene) acetic ester and at least one resin selected from a methyl methacrylate resin, a styrene resin and a methyl methacrylate-styrene copolymer resin, wherein the acetic ester is contained in the composition in an amount of from about 0.0005 part by weight to about 0.1 part by weight with respect to 100 parts by weight of the resin.

DETAILED DESCRIPTION OF THE PRESENT INVENTION

Figure 1:
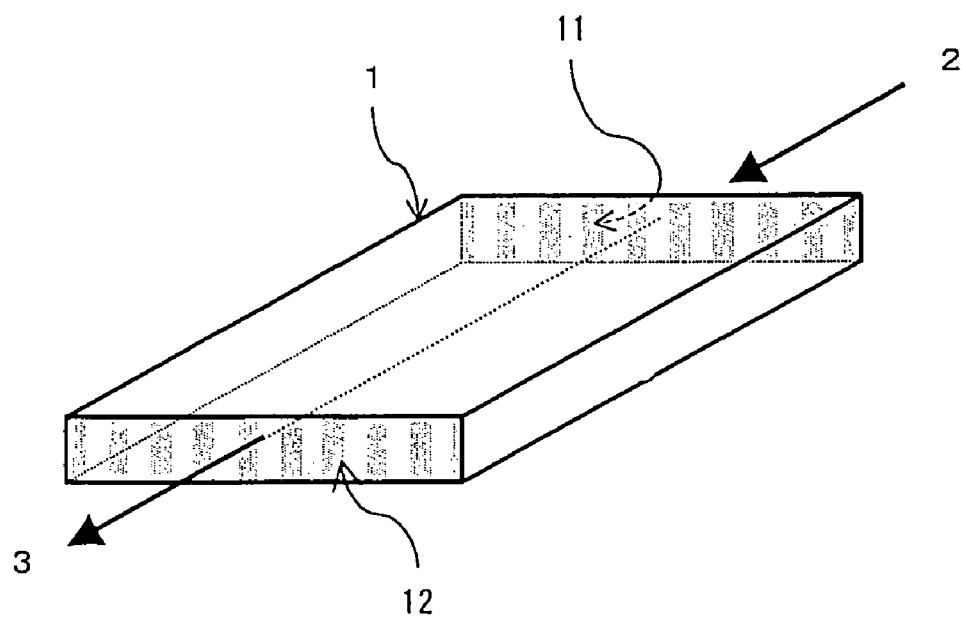
FIG. 1 is a schematic perspective view for describing an evaluating method of a test piece in Example, wherein each number indicates the following member:
1 test piece
2 white light (incident light)
3 transmitted light
11, 12 short-side-end faces.

A resin composition in the present invention contains a 2-(1-arylalkylidene) acetic ester and at least one resin selected from a methyl methacrylate resin, a styrene resin and a methyl methacrylate-styrene copolymer resin.

The methyl methacrylate resin may be a polymer having about 50% by weight or more of methyl methacrylate unit as a monomer unit thereof. Examples of the methyl methacrylate resin include a polymethyl methacrylate, which is a homopolymer substantially made only from methyl methacrylate, a copolymer of about 50% by weight or more of methyl methacrylate and less than about 50% by weight of an unsaturated monomer copolymerizable with methyl methacrylate, and the like.

Examples of the unsaturated monomer copolymerizable with methyl methacrylate in the methyl methacrylate resin include methacrylates other than methyl methacrylate, such as ethyl methacrylate, butyl methacrylate, cyclohexyl methacrylate, phenyl methacrylate, benzyl methacrylate, 2-ethylhexyl methacrylate and 2-hydroxyethyl methacrylate; acrylates such as methyl acrylate, ethyl acrylate, butyl acrylate, cyclohexyl acrylate, phenyl acrylate, benzyl acrylate, 2-ethylhexyl acrylate and 2-hydroxyethyl acrylate; unsaturated acids such as methacrylic acid and acrylic acid; acrylonitrile, methacrylonitrile, maleic anhydride, phenylmaleimide, cyclohexylmaleimide, and the like. Two kinds or more of them can be used as required. The copolymer as a methyl methacrylate resin may have a glutaric anhydride unit and/or a glutarimide unit.

The above-mentioned unsaturated monomer copolymerizable with methyl methacrylate is preferably an acrylic alkyl such as methyl acrylate in view of easiness in mold processing. When acrylic alkyl is used as the unsaturated monomer, the above-mentioned copolymer preferably has about 80% by weight to about 99.5% by weight of methyl methacrylate unit and about 0.5% by weight to about 20% by weight of acrylic alkyls unit.

While a resin composition in the present invention contains at least one resin selected from a methyl methacrylate resin, a styrene resin and a methyl methacrylate-styrene copolymer resin, the composition preferably contains a styrene resin and/or a methyl methacrylate-styrene copolymer resin, since the resulting resin composition tends to be difficult to absorb water, desirably.

The styrene resin may be a polymer having about 50% by weight or more of styrene unit as a monomer unit thereof. Examples of the styrene resin include a polystyrene, which is a homopolymer substantially made only from styrene (including styrene derivatives such as α-methyl styrene), a copolymer of about 50% by weight or more of styrene and less than about 50% by weight of an unsaturated monomer copolymerizable with styrene, and the like.

Examples of the unsaturated monomer copolymerizable with styrene in the styrene resin include the monomers which have been mentioned above as the monomers copolymerizable with methyl methacrylate.

The methyl methacrylate-styrene copolymer resin which may be contained in a resin composition in the present invention is a copolymer having methyl methacrylate unit and styrene unit as monomer units thereof. The methyl methacrylate-styrene copolymer resin may be a copolymer resin having about 10% by weight to about 90% by weight of methyl methacrylate unit and about 10% by weight to about 90% by weight of styrene unit. Preferably, the methyl methacrylate-styrene copolymer resin is a copolymer resin having about 20% by weight to about 80% by weight of methyl methacrylate unit and about 20% by weight to about 80% by weight of styrene unit. More preferably, the methyl methacrylate-styrene copolymer resin is a copolymer resin having about 60% by weight to about 80% by weight of methyl methacrylate unit and about 20% by weight to about 40% by weight of styrene unit.

The methyl methacrylate-styrene copolymer resin may be a copolymer of methyl methacrylate, styrene and an unsaturated monomer copolymerizable with methyl methacrylate/ styrene described above.

A resin composition in the present invention contains a 2-(1-arylalkylidene) acetic ester. The amount of 2-(1-arylalkylidene) acetic ester contained therein may be about 0.0005 part by weight or more, is preferably about 0.003 part by weight or more, and is more preferably about 0.005 part by weight or more, with respect to 100 parts by weight of the total amounts of the resin contained together in the resin composition from the viewpoint of durability. Also, from the viewpoint of transparency, the amount of 2-(1-arylalkylidene) acetic ester may be about 0.1 part by weight or less, is preferably about 0.05 part by weight or less, and is more preferably about 0.03 part by weight or less, with respect to 100 parts by weight of the resin.

The 2-(1-arylalkylidene) acetic ester is preferably a compound represented by formula (1) from the viewpoint of durability.

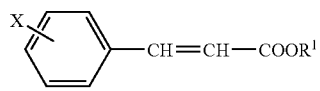

(1)

In formula (1), X represents a hydrogen atom, an alkyl group or an alkoxyl group, and $R^1$ represents an alkyl group.

The alkoxyl group as substituent X may be a linear alkoxyl group or a branched alkoxyl group. Examples of the alkoxyl group include an alkoxyl group with a carbon number of approximately 1 to 6 such as a methoxy group, an ethoxy group, an n-propoxy group, an isopropoxy group, an n-butoxy group, an isobutoxy group, a sec-butoxy group, a tert-butoxy group and an n-pentoxy group. Preferably the alkoxyl group is an alkoxyl group with a carbon number of approximately 1 to 4. The alkyl group as substituent X may be a linear alkyl group or a branched alkyl group. Examples of the alkyl group include an alkyl group with a carbon number of approximately 1 to 6, such as a methyl group, an ethyl group, an n-propyl group, an isopropyl group, an n-butyl group, an isobutyl group, a sec-butyl group, a tert-butyl group, an n-pentyl group and an n-hexyl group. The alkyl group is preferably an alkyl group with a carbon number of approximately 1 to 4, and is more preferably a methoxy group. Substituent X is preferably an alkoxyl group.

The alkyl group as substituent $R^1$ may be an alkyl group with a carbon number of approximately 1 to 10, such as a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, an n-decanyl group, a 1-methylpentyl group, a 1-ethylpentyl group, a 1-methylhexyl group and a 2-ethylhexyl group, preferably a methyl group, a 2-ethylhexyl group and the like. Preferably, the alkyl group as substituent $R^1$ is a methyl group and 2-ethylhexyl group.

A resin composition in the present invention may contain a hindered amine. Examples of the hindered amine include a compound having a 2,2,6,6-tetraalkylpiperidine skeleton.

Examples of such a hindered amine include a dimethyl succinate/1-(2-hydroxyethyl)-4-hydroxy-2,2,6,6-tetramethylpiperidine polycondensate, a poly((6-(1,1,3,3-tetramethylbutyl)imino-1,3,5-triazine-2,4-diyl) ((2,2,6,6-tetramethyl-4-piperidyl)imino)hexamethylene((2,2,6,6-tetramethyl-4-piperidyl)imino)), a 2-(2,3-di-t-butyl-4-hydroxybenzyl)-2-n-butylmalonicbis(1,2,2,6,6-pentamethyl-4-piperidyl), a 2-(3,5-di-t-butyl-4-hydroxybenzyl)-2-n-butylmalonicbis(1, 2,2,6,6-pentamethyl-4-piperidyl), an N,N'-bis(3-aminopropyl)ethylenediamine/2,4-bis(N-butyl-N-(1,2,2,6,6-pentamethyl-4-piperidyl)amino)-6-chloro-1,3,5-triazine condensate, a bis(2,2,6,6-tetramethyl-4-piperidyl)sebacate, a succinicbis(2,2,6,6-tetramethyl-4-piperidyl), and the like.

The hindered amine may be a compound represented by formula (2).

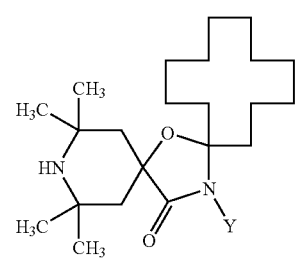

(2)

In formula (2), Y represents a hydrogen atom, an alkyl group with a carbon number of 1 to 20, a carboxyalkyl group with all carbon numbers of 2 to 20, an alkoxyalkyl group with all carbon numbers of 2 to 25, or an alkoxycarbonylalkyl group with all carbon numbers of 3 to 25.

The alkyl group as substituent Y may be a linear alkyl group or a branched alkyl group. The alkyl group composing the carboxyalkyl group as substituent Y may be a linear alkyl group or a branched alkyl group. Each of two alkyl groups composing the alkoxyalkyl group may be a linear alkoxylalkyl group or a branched alkoxylalkyl group. Substituent Y is preferably a hydrogen atom or an alkoxycarbonylalkyl group with all carbon numbers of 5 to 24, is more preferably a hydrogen atom or an alkoxycarbonylethyl group. Examples of the alkoxycarbonylethyl group include a dodecyloxycarbonylethyl group, a tetradecyloxycarbonylethyl group, a hexadecyloxycarbonylethyl group, an octadecyloxycarbonylethyl group, and the like.

When a hindered amine is contained in a resin composition in the present invention, the amount of the hindered amine contained therein may be about 0.0001 part by weight or more, is preferably about 0.001 part by weight or more, and is more preferably about 0.003 part by weight or more, with respect to 100 parts by weight of the resin contained together. In view of cost, the amount of the hindered amine may be about 0.1 part by weight or less, is preferably about 0.05 part by weight or less, and is more preferably about 0.03 part by weight or less, with respect to 100 parts by weight of the resin.

Also, the amount of the hindered amine may be about 1 (one) part by weight or less, and is preferably in the range of from about 0.1 part by weight to about 0.8 part by weight, with respect to 1 (one) part by weight of the 2-(1-arylalkylidene) acetic ester.

A resin composition in the present invention may contain various additives. Examples of the additives include a matting agent, a light diffusing agent such as siloxane-based crosslinking resin particles, styrene-based crosslinking resin particles, acryl-based crosslinking resin particles, glass particles, talc, calcium carbonate and barium sulfate; an antistatic agent such as sodium alkyl sulfonate, sodium alkyl sulfate, stearic monoglyceride and polyether ester amide; an antioxidant such as hindered phenols; a flame retardant such as phosphates; and a lubricant such as palmitic acid and stearyl alcohol. These additives may be used each singly or in a combination of two kinds or more of them.

A resin composition in the present invention can be produced, for example, by melting and kneading a resin and a 2-(1-arylalkylidene) acetic ester. In the case where a resin composition of the present invention contains a hindered amine and/or an additive, the resin composition can be obtained by melting and kneading the hindered amine and the additive together with a resin and a 2-(1-arylalkylidene) acetic ester to be contained therein. For the melting and kneading, a kneader or an extruder such as a single or twin screw extruder may be used.

A resin composition in the present invention and an article thereof can also be produced by mixing the 2-(1-arylalkylidene) acetic ester with the monomers mentioned above for producing a resin (or with a syrup containing a partial polymer of the monomers) and then polymerizing the monomers. It is noted that the partial polymer is a polymer obtained by partially polymerized monomers, and the syrup is a mixture of a (partial) polymer and the monomers. The resin composition containing an hindered amine and an additive in the present invention can also be produced by mixing the 2-(1-arylalkylidene) acetic ester, the monomers, the hindered amine and the additive and then polymerizing the monomers. The polymerization may be performed in a batch manner or in a continuous manner. For example, when the polymerizing is conducted in a cell, a molded article of the resin composition can be obtained.

A light guide can be obtained from a resin composition in the present invention, for example, by molding the resin composition into a sheet in an extrusion molding method using a T die and a roll unit, or into a plate or wedge shape in an injection molding method or a press molding method. The light guide can also be obtained by molding the resin composition into a sheet in a cast polymerization method.

A resin composition in the present invention is substantially colorless and transparent, and is also sufficient in durability, so that a molded article obtained by molding the composition is suitably used, for example, as optical parts, and is preferably used particularly as a light guide or sheet. Such a light guide or sheet is suitably used for a backlight of a liquid crystal display device and the like having a screen size of 14 inch type (diagonal line: 35.6 cm) or larger, more preferably having a screen size of 20 inch type (diagonal line 50.8 cm) or larger.

A resin composition of the present invention is improved in durability without deteriorating the excellent properties of the resin contained therein, such as being colorless and transparent.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2003-85680filed on Mar. 26, 2003, indicating specification, claims, drawings and summary, are incorporated herein by reference in their entirety.

EXAMPLE

The present invention is described in more detail by reference to the following Examples, which should not be construed as a limitation upon the scope of the present invention.

Example 1

A hundred (100) parts by weight of methyl methacrylate resin (that is a copolymer of 96% by weight of methyl methacrylate unit and 4% by weight of methyl acrylate unit, pellet-like shape) and 0.003 part by weight of 2-ethylhexyl 2-(paramethoxybenzylidene)acetate [that is a compound represented by formula (1) in which substituent X is a methoxy group and $R^1$ is a 2-ethylhexyl group] were mixed with each other at a room temperature (about 20° C.), which were them thrown into a single axial extruder [having a screw diameter of 40 mm, with a vent] to be melt and kneaded, and then were extruded from a T die (having a rip width of 250 mm and a rip interval of 6 mm) at an extrusion temperature of 250° C. The extruded composition were cooled while being passed through three polishing rolls, whereby being molded into a continuous sheet having a thickness of 3.5 mm and a width of 22 cm. The obtained sheet was cut out into a strip having a width of 7 cm and a length of 30 cm, which was then mirror-polished at an end face thereof, whereby obtaining a test piece.

As shown in FIG. 1, while white light (2) is allowed to enter this test piece (1) from one short-side-end face (11) in a long side direction, a light transmittance ($T_{400}$) (at a wavelength of 400 nm) and an average transmittance ($T_t$) (in a wavelength range of from 380 nm to 780 nm) were measured with regard to transmitted light (3) which was transmitted through the test piece (1) in the long side direction and was emitted from the other short-side-end face (12). As a result, $T_{400}$ and $T_t$ were found to be 78% and 82%, respectively, and the ratio ($T_{400}/T_t$) of $T_{400}$ to $T_t$ was found to be 0.95. The resulting transmitted light was scarcely colored on visual observation.

The test piece obtained as described above was irradiated with ultraviolet rays at a temperature of 60° C. for 8 days, and thereafter, was evaluated similarly to the above. As a result, $T_{400}$, $T_t$ and $T_{400}/T_t$ were 72%, 82% and 0.88, respectively. The transmitted light was scarcely colored on visual observation.

Comparative Example 1

A test piece was obtained and was evaluated in the same manner as in Example 1 except for not using 2-ethylhexyl 2-(paramethoxybenzylidene)acetate. As a result, $T_{400}$, $T_t$ and $T_{400}/T_t$ were 81%, 84% and 0.96, respectively. The transmitted light was scarcely colored on visual observation.

The test piece obtained was irradiated with ultraviolet rays in the same manner as in Example 1. As a result, $T_{400}$, $T_t$ and $T_{400}/T_t$ were 0%, 37% and 0, respectively. The transmitted light was yellowish on visual observation.

Comparative Example 2

A test piece was obtained and was evaluated in the same manner as in Example 1 except for replacing 2-ethylhexyl 2-(paramethoxybenzylidene)acetate with 0.01 part by weight of 2-(2-hydroxy-5-methylphenyl)-2H-benzotriazole. As a result, $T_{400}$, $T_t$ and $T_{400}/T_t$ were found to be 39%, 78% and 0.50, respectively. It was found that this test piece had a smaller $T_{400}/T_t$ value than that of the test piece obtained in Example 1. Also, the transmitted light was slightly yellowish on visual observation.

Comparative Example 3

A test piece was obtained and was evaluated in the same manner as in Example 1 except for replacing 2-ethylhexyl 2-(paramethoxybenzylidene) acetate with 0.01 part by weight of 2,4-dihydroxybenzophenone. As a result, $T_{400}$, $T_t$ and $T_{400}/T_t$ were 36%, 78% and 0.46, respectively. It was found that this test piece had a smaller $T_{400}/T_t$ value than that of the test piece obtained in Example 1. Also, the transmitted light was slightly yellowish on visual observation.

Comparative Example 4

A test piece was obtained and was evaluated in the same manner as in Example 1 except for replacing 2-ethylhexyl 2-(paramethoxybenzylidene) acetate with 0.01 part by weight of 2,2'-methylenebis(4-(1,1,3,3-tetramethylbutyl)-6-((2H-benzo triazole-2-yl) phenol). As a result, $T_{400}$, $T_t$ and $T_{400}/T_t$ were 3%, 76% and 0.04, respectively. It was found that this test piece had a smaller $T_{400}/T_t$ value than that of the test piece obtained in Example 1. Also, the transmitted light was yellowish on visual observation.

Example 2

A hundred (100) parts by weight of methyl methacrylate and 0.002 part by weight of 2,2'-azobis-isobtylonitrile were mixed with each other and were partially polymerized at a temperature of 80° C. to obtain a syrup containing a partial polymer thereof with a polymer content of 5% by weight.

Into a hundred (100) parts by weight of the syrup, 0.01 part by weight of 2-ethylhexyl 2-(paramethoxybenzylidene) acetate and 0.08 part by weight of 2,2'-azobisisobtylonitrile were added and mixed therewith. The resulting mixture was deaired under a reduced pressure (absolute pressure: 87 KPa) for 30 minutes. After that, the mixture was placed in a cell for polymerization, the cell being composed of two sheets of tempered glass (30 cm×30 cm) and a gasket made from vinyl chloride. The cell containing the mixture was heated to a temperature of 72° C. and was maintained at the temperature for 3 hours. Continuously, the cell was heated to a temperature of 120° C. and was maintained at the temperature for one (1) hour to polymerize the monomers contained therein, thereby obtaining a sheet of methyl methacrylate resin with a thickness of 2 mm.

The obtained sheet was cut out into a small piece (7 cm×7 cm) as a test piece. A light transmittance ($T_{400}$) and an average transmittance ($T_t$) of the piece were measured, respectively, with regard to transmitted light which was transmitted through the test piece from one side of the piece in the direction of the thickness (2 mm) and was emitted from the other side thereof. As a result, $T_{400}$ and $T_t$ were found to be 92% and 93%, respectively, and the ratio ($T_{400}/T_t$) of $T_{400}$ to $T_t$ was found to be 0.99.

The test piece obtained as described above was irradiated with ultraviolet rays at a temperature of 60° C. for 8 days, and thereafter, was evaluated similarly to the above. As a result, $T_{400}$, $T_t$ and $T_{400}/T_t$ were 80%, 90% and 0.89, respectively.

Example 3

A test piece of a sheet with a thickness of 2 mm was obtained and was evaluated in the same manner as in Example 2, except that the amount of 2-ethylhexyl 2-(paramethoxybenzylidene)acetate was changed from 0.01 part by weight to 0.02 part by weight. As a result, $T_{400}$, $T_t$ and $T_{400}/T_t$ were 92%, 93% and 0.99, respectively.

The test piece obtained was irradiated with ultraviolet rays in the same manner as in Example 2. As a result, $T_{400}$, $T_t$ and $T_{400}/T_t$ were 82%, 91% and 0.91, respectively.

Example 4

A syrup was prepared by mixing methyl methacrylate (49% by weight), styrene (33% by weight) and a methyl methacrylate-styrene copolymer resin (18% by weight; composed of methyl methacrylate monomer unit of 60% by weight in terms of the resin).

Into a hundred (100) parts by weight of the syrup, 0.02 part by weight of t-butylperoxyisopropylcarbonate and 0.02 part by weight of 2-ethylhexyl 2-(paramethoxybenzylidene) acetate were added and mixed therewith. The resulting mixture was deaired under reduced pressure (absolute pressure: 87 KPa) for 30 minutes. After that, the mixture was placed in a cell for polymerization, the cell being composed of two sheets of tempered glass (30 cm×30 cm) and a gasket made from vinyl chloride. The cell containing the mixture was heated and maintained in the same manner as in Example 2, to obtain a sheet of methyl methacrylate-styrene copolymer resin with a thickness of 2 mm.

The obtained sheet was cut out into a small piece (7 cm×7 cm) as a test piece. The obtained test piece was evaluated in the same manner as in Example 2. As a result, $T_{400}$ and $T_t$ were found to be 91% and 92%, respectively, and the ratio ($T_{400}/T_t$) of $T_{400}$ to $T_t$ was found to be 0.99.

The test piece obtained as described above was irradiated with ultraviolet rays at a temperature of 60° C. for 8 days, and thereafter, was evaluated similarly to the above. As a result, $T_{400}$, $T_t$ and $T_{400}/T_t$ were 61%, 86% and 0.71, respectively.

Example 5

A test piece of a sheet with a thickness of 2 mm was obtained in the same manner as in Example 4, except that 0.02 part by weight of bis(2,2,6,6-tetramethyl-4-piperidyl) sebacate (trade name: TINUVIN 770; manufactured by Ciba-Geigy Ltd.) was further added to the mixture for polymerization. The obtained test piece was evaluated in the same manner as in Example 2. As a result, $T_{400}$, $T_t$ and $T_{400}/T_t$ were 91%, 92% and 0.99, respectively.

The test piece obtained was irradiated with ultraviolet rays in the same manner as in Example 2. As a result, $T_{400}$, $T_t$ and $T_{400}/T_t$ were 72%, 88% and 0.82, respectively.

Example 6

A test piece of a sheet with a thickness of 2 mm was obtained in the same manner as in Example 4, except that a syrup which had been previously prepared by mixing methyl methacrylate (16% by weight), styrene (66% by weight) and a methyl methacrylate-styrene copolymer resin (18% by weight; composed of methyl methacrylate monomer unit of 20% by weight in terms of the resin) was used, instead of the syrup of methylmethacrylate (49% by weight), styrene (33% by weight) and a methyl methacrylate-styrene copolymer resin (18% by weight; composed of methyl methacrylate monomer unit of 60% by weight in terms of the resin). The obtained test piece was evaluated in the same manner as in Example 2. As a result, $T_{400}$, $T_t$ and $T_{400}/T_t$ were 89%, 90% and 0.99, respectively.

The test piece obtained was irradiated with ultraviolet rays in the same manner as in Example 2. As a result, $T_{400}$, $T_t$ and $T_{400}/T_t$ were 49%, 83% and 0.59, respectively.

Example 7

A test piece of a sheet with a thickness of 2 mm was obtained in the same manner as in Example 6, except that 0.02 part by weight of bis(2,2,6,6-tetramethyl-4-piperidyl) sebacate (trade name: TINUVIN 770; manufactured by Ciba-Geigy Ltd.) was further added to the mixture for polymerization. The obtained test piece was evaluated in the same manner as in Example 2. As a result, $T_{400}$, $T_t$ and $T_{400}/T_t$ were 89%, 90% and 0.99, respectively.

The test piece obtained was irradiated with ultraviolet rays in the same manner as in Example 2. As a result, $T_{400}$, $T_t$ and $T_{400}/T_t$ were 61%, 86% and 0.71, respectively.

Comparative Example 5

A test piece of a sheet with a thickness of 2 mm was obtained in the same manner as in Example 6, except that 2-ethylhexyl 2-(paramethoxybenzylidene) acetate was not used. The obtained test piece was evaluated in the same manner as in Example 2. As a result, $T_{400}$, $T_t$ and $T_{400}/T_t$ were 89%, 90% and 0.99, respectively.

The test piece obtained was irradiated with ultraviolet rays in the same manner as in Example 2. As a result, $T_{400}$, $T_t$ and $T_{400}/T_t$ were 10%, 73% and 0.14, respectively.

What is claimed is:

1. A resin composition comprising a 2-(1-arylalkylidene) acetic ester and at least one resin selected from a methyl methacrylate resin, a styrene resin and a methyl methacrylate-styrene copolymer resin, wherein the acetic ester is contained in the composition in an amount of from about 0.0005 part by weight to about 0.05 part by weight with respect to 100 parts by weight of the resin.

2. A resin composition according to claim 1, wherein the 2-(1-arylalkylidene) acetic ester is a compound represented by formula (1)

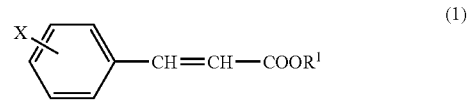

(1)

wherein X represents a hydrogen atom, an alkyl group or an alkoxyl group, and $R^1$ represents an alkyl group.

3. A molded article obtainable by molding a resin composition according to claim 1 or 2.

4. A molded article according to claim 3, wherein the article is a light guide.

* * * * *